United States Patent [19]
Phillips

[11] Patent Number: 5,987,311
[45] Date of Patent: *Nov. 16, 1999

[54] APPARATUS FOR ENABLING A KEYPAD IN RESPONSE TO ANTENNA EXTENSION

[75] Inventor: John Charles Phillips, Apex, N.C.

[73] Assignee: Ericsson Inc., Research Triangle Park, N.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/773,438

[22] Filed: Dec. 27, 1996

[51] Int. Cl.$^6$ ........................................... H04B 1/38
[52] U.S. Cl. ............................. 455/90; 455/575; 343/702
[58] Field of Search ................................ 455/575, 90.95, 455/129, 128, 347, 348, 351; 379/433, 442; 343/702

[56] References Cited

U.S. PATENT DOCUMENTS

| | | | |
|---|---|---|---|
| 4,845,772 | 7/1989 | Metroka et al. | 379/61 |
| 4,860,024 | 8/1989 | Egashira | 343/702 |
| 4,862,182 | 8/1989 | Egashira | 343/702 |
| 4,984,295 | 1/1991 | Engstrom et al. | 455/186 |
| 5,138,329 | 8/1992 | Saarnimo et al. | 343/702 |
| 5,212,725 | 5/1993 | Yamamoto | 379/58 |
| 5,321,738 | 6/1994 | Ha | 379/61 |
| 5,353,036 | 10/1994 | Balry | 343/702 |
| 5,389,938 | 2/1995 | Harison | 343/702 |
| 5,497,506 | 3/1996 | Takeyasu | 455/89 |
| 5,583,519 | 12/1996 | Koike | 343/702 |
| 5,635,943 | 6/1997 | Grunwell | 343/702 |
| 5,640,689 | 6/1997 | Rossi | 455/89 |
| 5,686,927 | 11/1997 | Simmons | 343/702 |

FOREIGN PATENT DOCUMENTS

| | | | |
|---|---|---|---|
| WO 93/01659 | 1/1993 | WIPO | H04B 1/38 |
| WO93/01659 | 1/1993 | WIPO . | |

OTHER PUBLICATIONS

PCT/US97/24173 International Search Report.

*Primary Examiner*—Reinhard J. Eisenzopf
*Assistant Examiner*—Duc Nguyen
*Attorney, Agent, or Firm*—Jenkens & Gilchrist, P.C.

[57] ABSTRACT

An antenna switch is provided on a portable telecommunication instrument, such as a cellular telephone, to enable operation of the keypad of the instrument when the antenna is extended. In one arrangement, an antenna switch comprises a pair of antenna position sensing contacts disposed on a printed circuit board at a position where electrical continuity is established between the contacts by an electrically conductive member on the antenna when the antenna is in an extended position. The present invention solves the problem of inadvertent activation of the instrument when the antenna is retracted. Thus, the instrument does not require a closeable cover over the keypad to prevent inadvertent actuation of the instrument.

6 Claims, 5 Drawing Sheets

APPARATUS FOR ENABLING A KEYPAD IN RESPONSE TO ANTENNA EXTENSION

BACKGROUND OF THE INVENTION

1. Technical Field

This invention relates generally to an apparatus for enabling the keypad of an electronic instrument such as a cellular telephone, and more particularly to such an apparatus which enables operation of the keypad in response to extension of an antenna.

2. History of Related Art

It is very easy to inadvertently depress the keypad of an electronic instrument, such as a cellular telephone, while carrying the phone in a pocket or purse. This is particularly true with today's small cellular telephones. The inadvertent activation of the telephone can lead to a number of problems, ranging from low battery life due to excessive current drain to missing calls because the phone was accidentally turned off.

Heretofore, the only solution to inadvertent activation of the keypad has been to incorporate a "flip" cover over the keypad in order to protect the keys when the phone is carried in a purse, briefcase or pocket. However, flip covers present a number of problems. The three most troublesome problems include the additional steps required to answer a telephone equipped with a flip cover, increased thickness that a flip cover adds to the instrument, and the extra cost added to the instrument as a result of the cover and other added components. More specifically, when a telephone is equipped with a flip cover, the telephone must be removed from a pocket or other place of storage, the flip cover must be opened, the antenna extended, and the "SEND" key depressed to answer the call unless the flip cover is equipped with a switch which automatically answers the call when the cover is opened. The increased thickness added to the instrument as a result of the flip cover decreases the comfort and compactness of the instrument when carried in a pocket. The extra cost added to the manufacture of an instrument equipped with a flip cover does not result in any additional utility of the instrument.

One attempt to reduce the inadvertent activation of the keypad is described in U.S. Pat. No. 4,845,772 issued Jul. 4, 1989 to Metroka et al. In the Metroka radiotelephone, the flip cover activates a hook switch which establishes power to the phone when moved to an open position. While this arrangement is somewhat beneficial, use of the phone to receive or transmit calls still requires extension of the antenna. Furthermore, if the antenna is not extended to its full length, not only is signal reception and transmission quality diminished, but also the antenna will be in undesirably close proximity to the user's head, thereby increasing the user's specific absorption rate (SAR) of electromagnetic energy emitted from the antenna.

It is therefore desirable to have a method of preventing inadvertent activation of a keypad of an instrument without adding steps required to answer a call. It is further desirable to have such an instrument that enables the user to answer a call simply by removing the phone from the user's pocket or other place of temporary storage and fully extending the antenna to its intended operational position. When the antenna is at it's correct operational position, the user can directly respond to the incoming call with assurance that the antenna is at its properly spaced from the user's head and that the signal will not break up due to insufficient antenna length. Furthermore, on outgoing calls it is desirable to have an instrument with a keypad that is enabled simply by extending the antenna of the instrument. It is still further desirable to have such an instrument that has a thin profile and can be comfortably carried in the pocket of a jacket or shirt. It is further desirable to have such an instrument that is economical to produce and does not add significant complexity or cost to the instrument.

SUMMARY OF THE INVENTION

In accordance with one aspect of the present invention, a telecommunication instrument has a keypad, a housing, and an antenna. The antenna has a distal end and a proximal end relative to the housing. The distal end is movable between a retracted and an extended position. An electrically conductive member is provided on the antenna at a position adjacent the proximal end of the antenna. The telecommunication instrument further includes a pair of electrical contacts positioned between the keypad and at least one electrical circuit that is operative in response to depressing a key on the keypad. The pair of electrical contacts are placed in electrical communication with each other in response to the antenna being, in different respective embodiments, at either the extended or the retracted positions.

Other features of the telecommunication instrument embodying the present invention include the instrument having a printed circuit board that has the pair of electrical contacts mounted on the board at a position at which both of the contacts are in common electrical communication with the electrically conductive member on the antenna when the antenna is, in one embodiment at an extended position, and at another embodiment at a retracted position.

BRIEF DESCRIPTION OF THE DRAWINGS

A more complete understanding of the structure and operation of the present invention may be had by reference to the following detailed description when taken in conjunction with the accompanying drawings, wherein.

DETAILED DESCRIPTION OF PRESENTLY PREFERRED EXEMPLARY EMBODIMENTS

Figure 1:
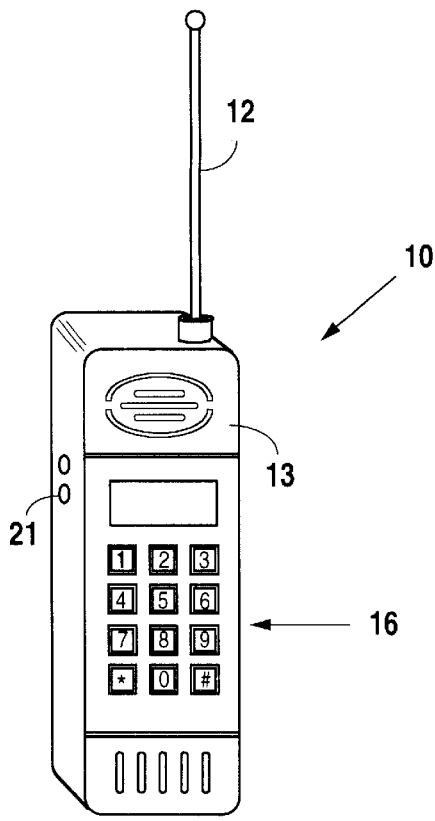
FIG. 1 is a three-dimensional view of a cellular telephone, embodying the present invention, showing the antenna of the phone in an extended position.
Figure 2:
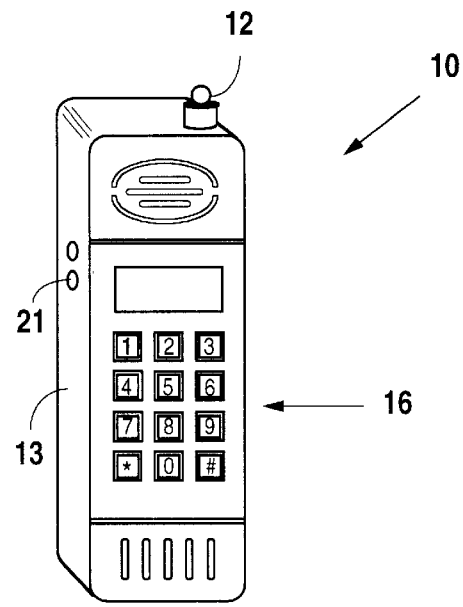
FIG. 2 is a three-dimensional view of a cellular telephone embodying the present invention, showing the antenna of the phone in a retracted position.

In the preferred embodiment of the present invention, a small portable telecommunication instrument such as a cellular telephone 10 is shown in FIG. 1 with an antenna 12 at an extended position, and in FIG. 2 with the antenna 12 at a retracted position. As shown in drawings, the antenna 12 is mounted in a housing 13 such that it is extendable through an upper portion of the housing 13 to the extended position and movable to a lower portion of the housing 13 when at the retracted position. The cellular telephone 10 also has a printed circuit board 14 mounted within the housing 13 which typically has circuits formed therein and thereon with electrical components attached to the circuits as required to provide the desired radio frequency (RF) and operating logic circuits. The cellular telephone 10 also has a keypad 16 which is electrically connected to a keypad logic circuit to provide electrical signals in response to operation of the keys disposed on the keypad 16.

Figure 4:
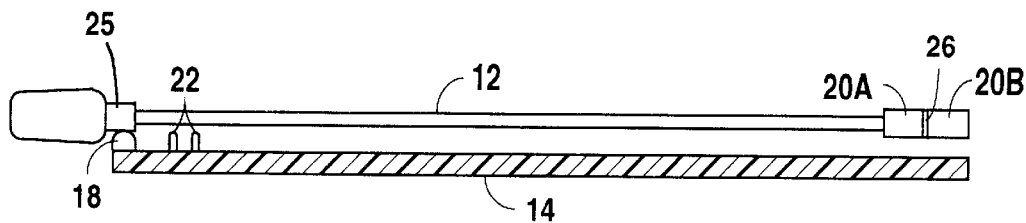
FIG. 4 is a schematic sectional view of the antenna and printed circuit board of the telecommunication instrument embodying the present invention, showing the antenna in the retracted position, as shown in FIG. 2.

In an exemplary embodiment, the printed circuit board 14 also has an RF signal contact 18 provided on the board 14 which makes electrical contact with an electrically conductive member 20 provided at the bottom, or proximal end, of the antenna 12, when the antenna 12 is extended, providing for transmittal of RF signals from the antenna 12 during use. Electrically conductive member 20 may include electrically conductive element 20A and electrically conductive element 20B which are separated by insulating layer 26. RF signals from the telephone's RF circuitry are coupled to and from antenna 12 by means of element 20A, while control signals are passed through element 20B. An additional conductive member 25 is positioned at the distal end of the antenna 12, as shown in FIG. 4, so that RF signals, for example an incoming call signal, are coupled from the antenna 12 to RF signal contact 18 when the antenna 12 is at the retracted position.

Figure 3:
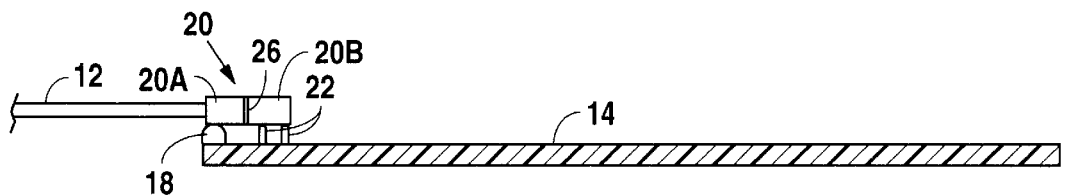
FIG. 3 is a schematic sectional view showing the antenna and a printed circuit board of a telecommunication instrument embodying the present invention, with the antenna in the extended position, as shown in FIG. 1.

In a preferred embodiment of the portable telecommunication instrument 10 embodying the present invention, a pair of antenna position sensing contacts 22 are provided on the printed circuit board 14 at a position at which the contacts 22 are placed in common electrical communication with the electrically conductive element 20B, positioned at the proximal end of the antenna 12, when the antenna 12 is at the extended position as shown in FIG. 3. Insulating layer 26 insures that the RF path of signals transmitted to and received from antenna 12 is not altered by circuitry connected to antenna position sensing contacts 22. In this embodiment, the antenna position sensing contacts 22 are electrically positioned between the keypad 16 and at least one electrical circuit operative in response to depressing a key on the keypad 16, as illustrated in block form in FIG. 6. Thus, when the antenna 12 is at the extended position, the electrically conductive element 20B is in contact with both of the antenna position sensing contacts 22 and electrical continuity is established between the contacts, providing a signal that connects the keypad 16 with the keypad logic circuits, and thereby enabling operation of the keypad 16 by the user. In addition to activating the keypad 16, the antenna position sensing contacts 22 may also be used to activate other electrical circuits in the cellular telephone 10, such as power or volume control circuits, or automatically answer incoming calls upon extension or terminate calls upon retraction of the antenna 12.

The antenna position sensing contacts 22 may also have other configurations and arrangements. For example, reed switches, Hall-effect switches, optical position-sensing switches, and similar position or proximity-sensing devices may be used as an alternative to the antenna position sensing contacts 22 illustrated in the drawings and described above.

Figure 5:
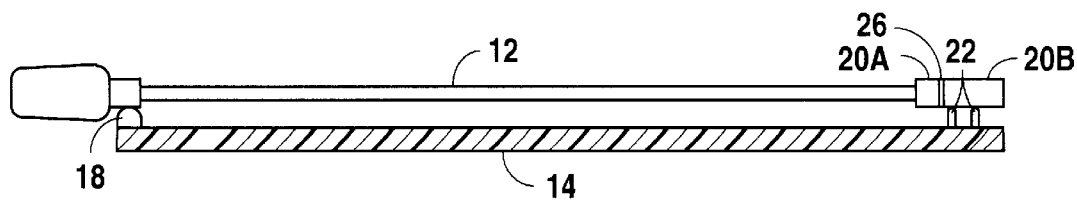
FIG. 5 is a schematic sectional view of an alternate embodiment of the antenna and printed circuit board of a telecommunications instrument embodying the present invention.

In an alternative embodiment, the antenna position sensing contacts 22 may be positioned on the printed circuit board 14 at a location where the electrically conductive element 20B, at the proximal end of the antenna 12, provides electrical continuity between the antenna position sensing contacts 22 when the antenna 12 is at the retracted position, as shown in FIG. 5. Thus, it can be seen that the antenna position sensing contacts 22 cooperate with the electrically conductive element 20B on the antenna 12 to form a switch that is open when the conductive element 20b is spaced from the contacts 22 and closed when the element 20B bridges the contacts 22. As shown in FIGS. 3 and 4, the position of the antenna position sensing contacts 22 is placed on the printed circuit board so that the continuity between the contacts 22 is established when the antenna is extended and, if desired, may provide direct electrical continuity between the keypad 16 and the keypad logic circuits. In the alternative embodiment shown in FIG. 5, electrical continuity between the contacts 22 is broken when the antenna is extended.

Figure 6:
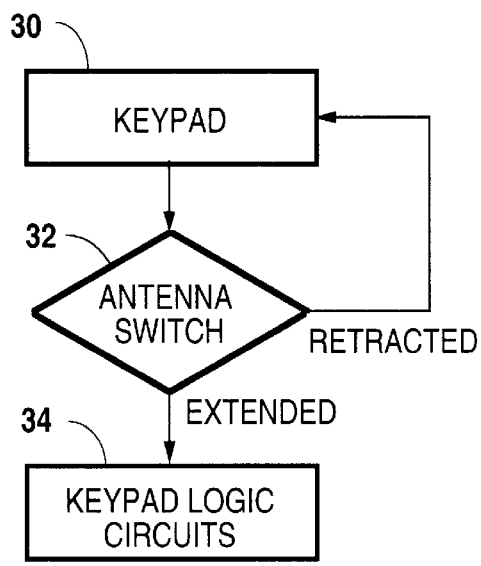
FIG. 6 is a flow chart illustrating the operation of the antenna-keypad switching system of the telecommunication instrument embodying the present invention.

As shown in FIG. 6, when a key on the keypad 16 is activated, as indicated at block 30, a signal is delivered to the antenna position sensing contacts 22 as represented by block 32. If the antenna is at the extended position, continuity is established between the position sensing contacts 22 and the signal representative of the depressed key on the keypad 16 is delivered to the keypad logic circuits as represented by block 34. If the antenna is in the retracted position, the signal produced by the depressed key of the keypad 16 is simply ignored and the signal returned to the keypad 16.

Alternatively, the automatic operation of the antenna sensing position contacts 22 to activate the keypad 16, or other features upon extension of the antenna 12, may be selectively controlled by positioning an antenna position circuit activating control switch 21, shown in FIGS. 1 and 2 as a side-mounted button switch, in parallel arrangement with the antenna sensing position contacts 22. By this arrangement, the antenna operation control switch 21, when closed, provides a bypass to override the antenna sensing position contacts 22. Thus, the keypad 16 can be enabled automatically by extension of the antenna 12 or, alternatively, the antenna extension-keypad enablement or other enablement feature can be selectively bypassed by activation, i.e., closing, of the antenna position circuit activation control switch 21.

If desired the antenna position circuit activation control switch 21 may be separately positioned from the same electrical circuit with the antenna sensing position contacts 22, and selective control of the antenna position activation feature carried out by software logic. This arrangement is illustrated in block form in FIG. 7. The signal delivered in response to a key actuated on the keypad 16, as represented at block 40, is first directed to the antenna position circuit activation control switch 21. As represented at block 42, if the antenna position circuit activation control switch 21 is in an "OFF" position, indicating that the antenna automatic activation feature is not desired, the signal generated by the keypad 16 is delivered directly to the keypad logic circuits as represented at block 44, and the keystroke signal processed. If the antenna position circuit activation control switch 21 is in an "ON" position, indicating that the antenna activation feature is desired, a determination is made as to the position of the antenna 12, as indicated at block 46. If the antenna 12 is at the extended position, the keypad-generated signal is processed, as shown at block 44, or, if not extended, i.e., in the retracted position, the signal is simply ignored and referred back to the origination point.

Thus, it can be seen that, in the first-described embodiment, when the antenna position contacts 22 have electrical continuity between them due to the electrically conductive element 20B bridging the contacts 22 when the antenna 12 is at the extended position, electrical circuits or, alternatively, software, is configured to accept keypad inputs. In the alternative embodiment illustrated in FIG. 5, software is configured to establish communication between the keypad 16 and the keypad logic circuits when electrical connection between the antenna position sensing contact 22 is interrupted.

It is desirable to separate the keypad and keypad logic circuits from the RF signal processing and other operational logic circuits of the instrument 10 to allow the telephone to ring for incoming calls. Alternatively, if desired, the software, or electrical circuitry, may be configured to answer a phone call when a change of antenna position is noted, as well as terminate a call when the antenna 12 is retracted.

Figure 7:
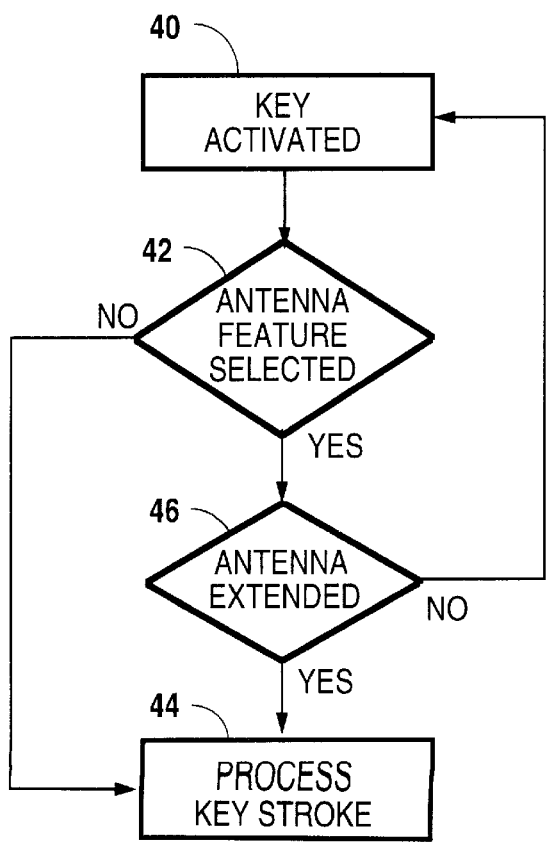
FIG. 7 is a flow chart illustrating another embodiment of the operation of the antenna keypad switching system of the telecommunication instrument embodying the present invention.

If software is used to control the operating logic of the instrument 10, the answering or termination of calls by extending or retracting the antenna may also be provided in the software, independent of the keypad lockout. Also, as described above, the activation-deactivation of the keypad 16 can be controlled by software as shown in FIG. 7. If the antenna position activation control switch 21 is set to bypass the antenna automatic activation feature, the keypad 16 will function normally whether the antenna 12 is in the up or down position.

Figure 8:
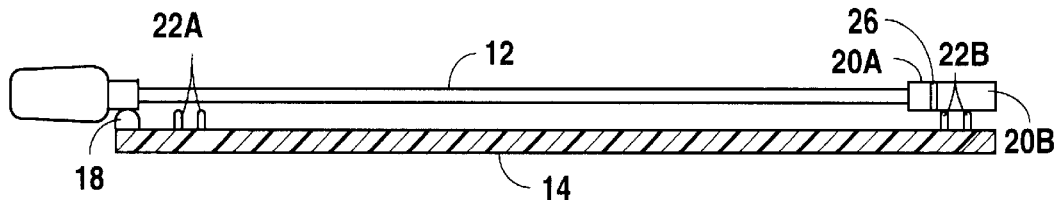
FIG. 8 is a schematic sectional view of another alternate arrangement of the antenna and printed circuit board of a telecommunication instrument embodying the present invention.

In the embodiment illustrated in FIG. 8, telephone 10 includes two pairs of electrical contacts 22A, 22B mounted on printed circuit board 14. Contacts 22A, 22B are mounted such that element 20B provides electrical continuity between contacts 22A when antenna 12 is in an extended position and between contacts 22B when in a retracted position. In this embodiment, it is possible for telephone 10 to sense when the antenna is in a fully retracted position, a fully extended position, or in an intermediate position.

Figure 9:
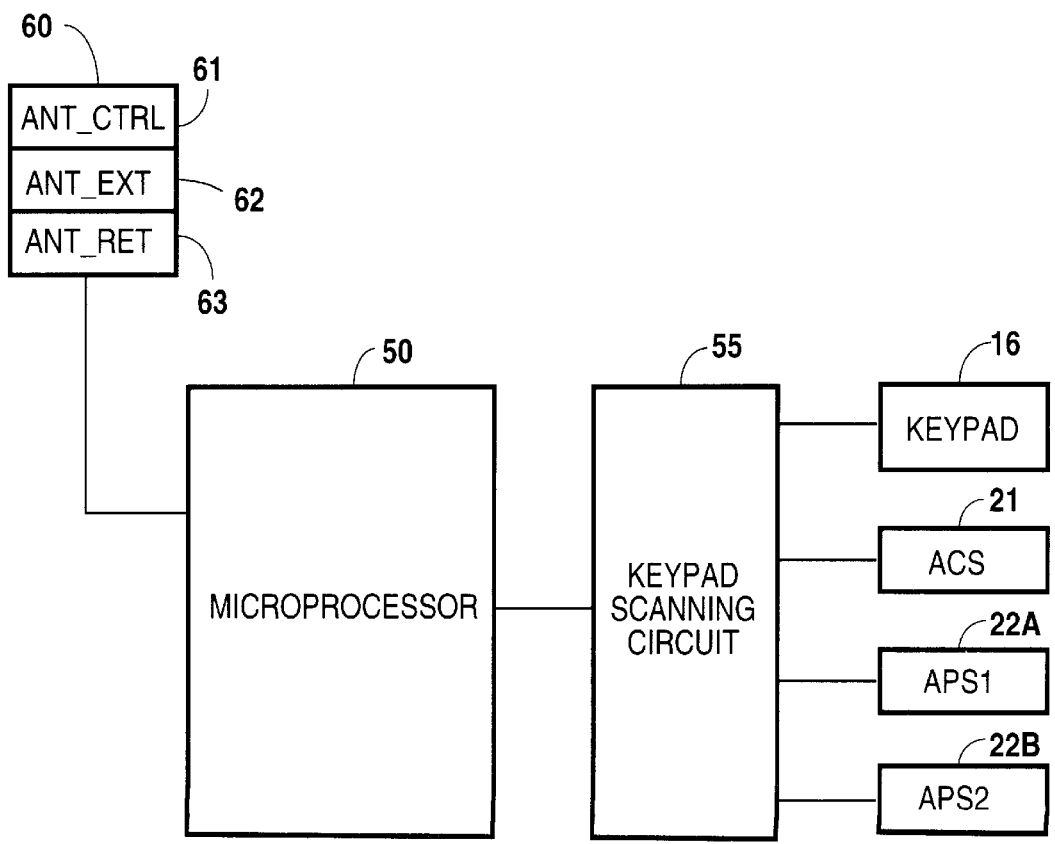
FIG. 9 is an electrical block diagram of the components in one arrangement of the telecommunication instrument embodying the present invention.

Software control of the system of the present invention may be performed in the embodiment illustrated in the electrical block diagram of FIG. 9. In FIG. 9, contacts 22A are shown as antenna position switch APS 1, contacts 22B are shown as antenna position switch APS2, and antenna position activation control switch 21 is shown as antenna control switch ACS. Switches APS1, APS2 and ACS are scanned by keypad scanning circuit 55, which is also coupled to keypad 16 and microprocessor 50. The design of the keypad scanning circuit 55 is conventional and is well known in the art. Switches APS1, APS2 and ACS are thus scanned by scanning circuit 55 in the same manner as buttons on keypad 16 are scanned. To wit, when any of APS1, APS2 or ACS is opened or closed, keypad scanning circuit 55 generates an interrupt in microprocessor 50 and a signal indicative of the current state of the open or closed switch is provided to microprocessor 50.

Microprocessor 50 includes a status register 60 which includes a plurality of binary valued status flags 61–63. In a preferred embodiment, register 60 includes antenna control status flag ANT_CTRL 61, antenna extended flag ANT_EXT 62 and antenna retracted flag ANT_RET 63.

When contacts 22A are closed (i.e., electrically connected) as indicated by scanning circuit 55, the ANT_EXT flag 62 is set to '1,' indicating that the antenna 12 has been fully extended; when contacts 22A are opened, the ANT_EXT flag 62 is set to '0,' indicating that the antenna 12 is no longer fully extended. When contacts 22B are closed, the ANT_RET flag 63 is set to '1,' indicating that the antenna 12 has been fully retracted; when contacts 22B are opened, the ANT_RET flag is set to '0,' indicating that the antenna 12 is no longer fully retracted. Thus, if the ANT_RET and ANT_EXT flags 62, 63 are both equal to '0,' the antenna 12 is in an intermediate position that is neither fully extended nor retracted. Thus, by examining the ANT_EXT and ANT_RET flags 62, 63, the microprocessor 50 can determine whether the antenna 12 is in a fully extended position, a fully retracted position, or an intermediate position.

When the antenna control switch ACS21 is closed, the ANT_CTRL flag 61 is set to '1,' indicating that the antenna control feature of the present invention is activated. When switch ACS21 is open, the ANT_CTRL flag 61 is set to '0,' indicating that the antenna control feature is inactivated. In an alternate embodiment, the ANT_CTRL flag 61 may be toggled each time switch ACS21 is closed. Such an arrangement allows ACS21 to be implemented as a spring-loaded, normally open pushbutton switch. In yet another embodiment, the ANT_CTRL flag 61 may be set via software by means of a user setup menu selection.

The operation of the circuit illustrated in FIG. 9 will now be described in connection with the flow diagram of FIG. 7. In block 40, microprocessor 50 detects that a key on keypad 16 has been pressed as indicated by a signal from keypad scanning circuit 55. In block 42, the microprocessor 50 then checks the status of the ANT_CTRL flag 61 to determine whether the antenna control feature has been enabled. If the ANT_CTRL flag 61 is set to '0,' the microprocessor proceeds to process the keystroke in block 44. If it is determined in block 42 that the antenna control feature has been enabled (as indicated by an ANT_CTRL flag 61 setting of '1 '), the microprocessor 50 then checks the status of the ANT_EXT flag 62 in block 46. If the ANT_EXT flag 62 is set to '0,' the keystroke is ignored, since the antenna is not fully extended. However, if the ANT_EXT flag 62 is set to '1,' then the microprocessor 50 processes the keystroke in block 44.

Figure 10:
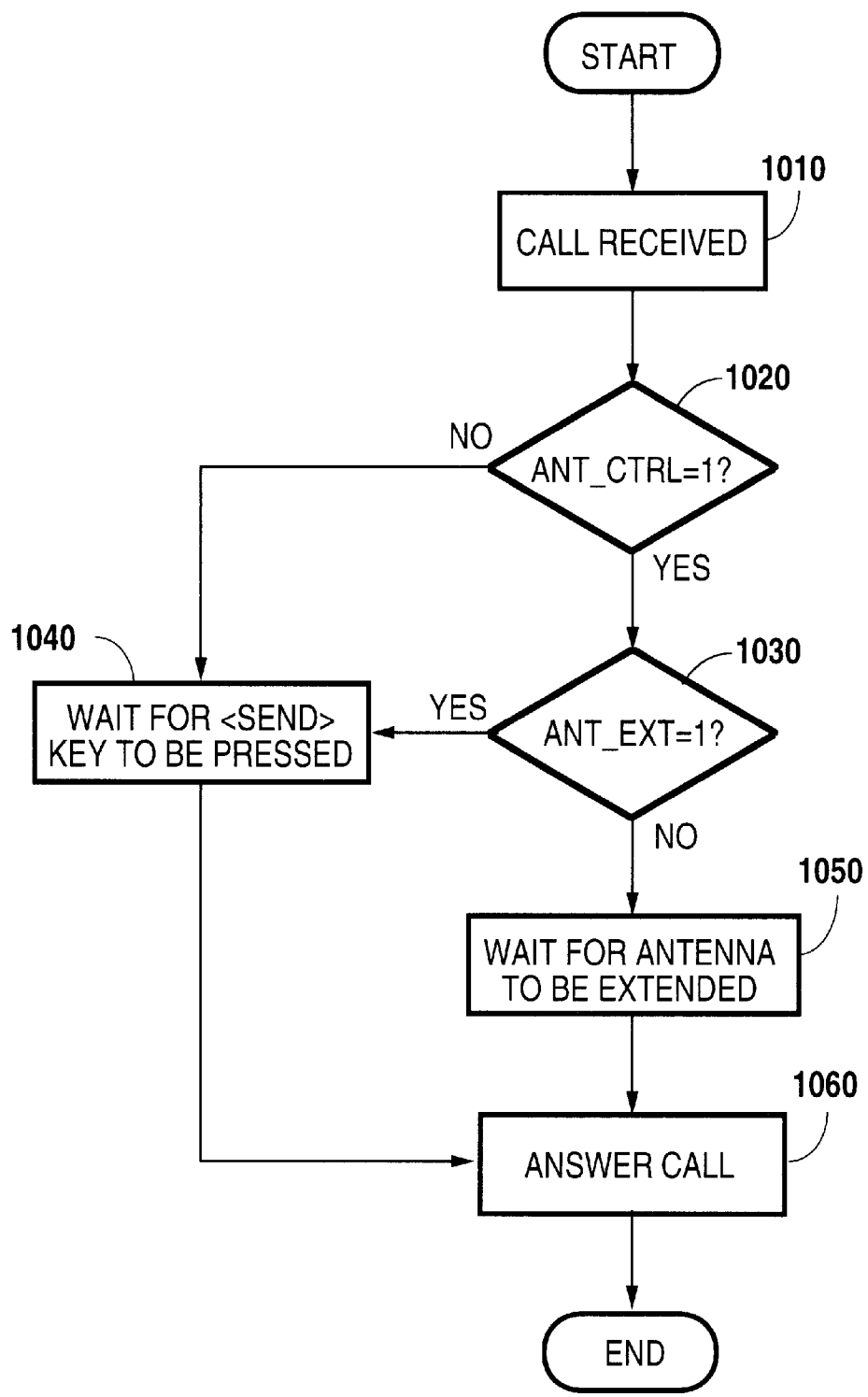
FIG. 10 is a flow diagram illustrating software used to control the operation of a telecommunication instrument embodying the present invention.

The embodiment illustrated in FIG. 9 also permits answering the radiotelephone 10 by extending the antenna 12 as illustrated by the flow diagram of FIG. 10. When a call is received, a radiotelephone is ordinarily answered by pressing a <SEND> key. In the embodiment of FIG. 9, the call may be answered by either extending the antenna 12 to a fully extended position or, if the antenna 12 is already fully extended, by pressing the <SEND> key. As illustrated in FIG. 10, a call is received in block 1010. Upon notification of an incoming call, microprocessor 50 immediately checks the status of the ANT_CTRL flag 61 in block 1020. If the ANT_CTRL flag 61 is set to '0,' (indicating that the antenna control feature is not enabled), the microprocessor 50 moves to block 1040 to wait for the <SEND> key to be pressed. If the ANT_CTRL flag 61 is equal to '1,' the microprocessor 50 checks in block 1030 to see if the antenna 12 is already extended by examining the ANT_EXT flag 62. If the ANT_EXT flag 62 is equal to '1,' (indicating that the antenna 12 is extended), the microprocessor 50 proceeds to block 1040 to wait for the <SEND> key to be pressed. If the antenna 12 is not extended, the microprocessor proceeds to block 1050 to wait for the antenna 12 to be extended. Once the antenna 12 is extended in block 1050 or the <SEND> key is pressed in block 1040, the microprocessor proceeds to answer the call in block 1060.

Figure 11:
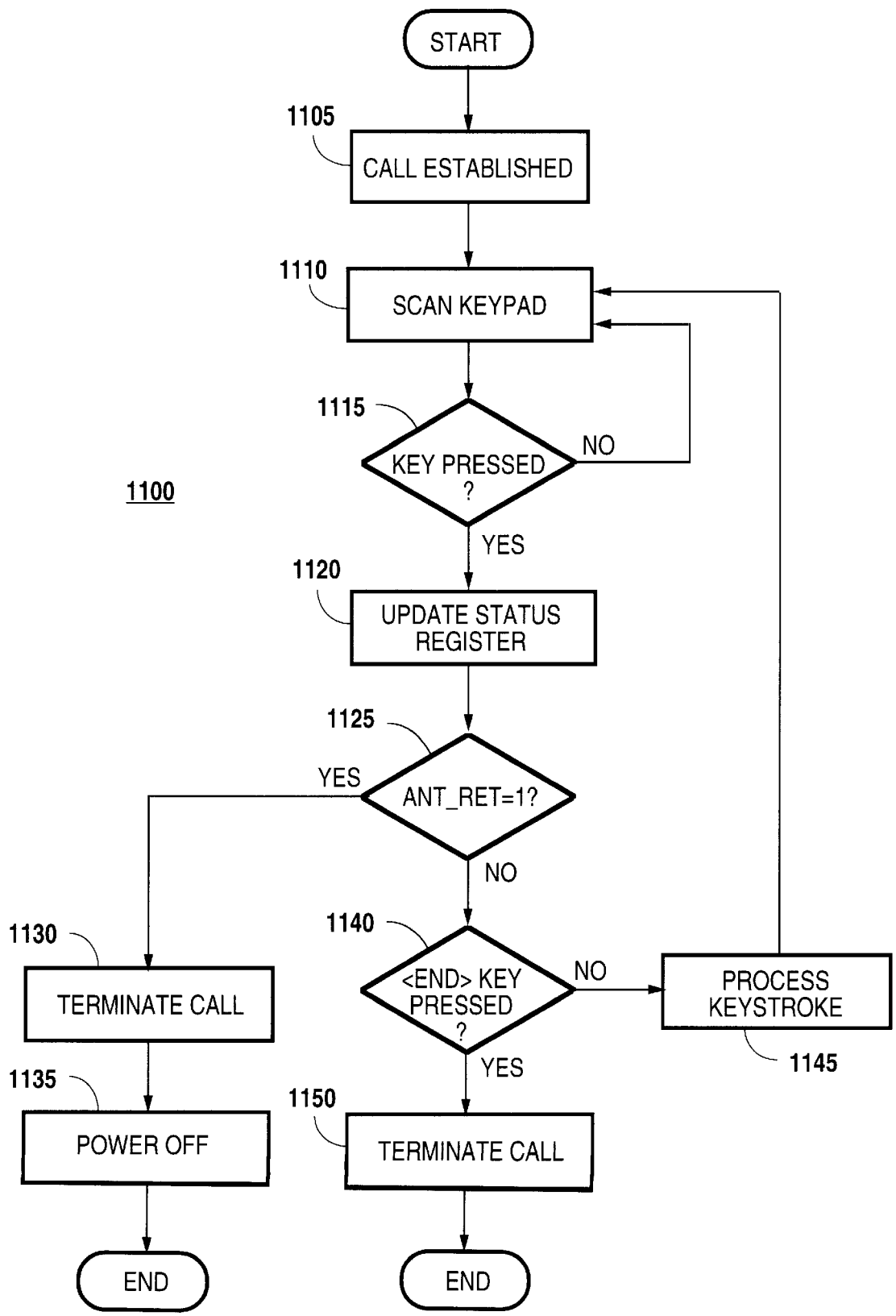
FIG. 11 is a flow diagram of another embodiment of the software controlling the operation of a telecommunication instrument embodying the present invention.

Call termination using the embodiment of FIGS. 8 and 9 is illustrated in the flow diagram of FIG. 11. After call establishment (indicated generally by block 1105), microprocessor 50 scans keypad 16 in block 1110. In Block 1115, the microprocessor 50 checks to see if a key has been pressed (or if a switch has been opened or closed). If so, microprocessor 50 updates the status register 60 in block 1120 responsive to the key or switch. If not, the microprocessor 50 returns to block 1110 to continue scanning the keypad 16.

After updating the status register 60 in block 1120, the microprocessor 50 checks the status of the ANT_RET flag 63 in block 1125 to determine if the antenna 12 has been fully retracted. It is noteworthy that, in this embodiment, microprocessor 50 does not check the status of ANT_EXT flag 62 to determine if the antenna 12 has been retracted. This is because the ANT_EXT flag 62 will be set to '0' if the antenna 12 is retracted only a short distance. If the call were to be terminated upon the ANT_EXT flag 62 being set to '0,' the call could be terminated unintentionally if, during a call, antenna 12 were accidentally retracted slightly.

If the ANT_RET flag 63 is equal to '1' (indicating that the antenna 12 has been fully retracted), the microprocessor 50 terminates the call in block 1130. The microprocessor 50 may then immediately power the telephone 10 off in block 1135.

If the ANT_RET flag 63 indicates that the antenna is not fully retracted, the microprocessor 50 then checks in block 1140 to see if the <END> key has been pressed. If the <END> key was not pressed, microprocessor 50 processes the keystroke and returns to scanning the keypad 16 in block 1110. If the <END> key was pressed, the microprocessor 50 terminates the call in block 1150.

Thus, the antenna activated keypad system embodying the present invention provides a number of important advantages over current instruments not having this feature. A minimum number of steps are required to answer a call because the telephone need simply be removed from a user's pocket and the antenna extended to answer a call. The keypad is automatically protected against inadvertent commands without the need for a flip cover and, therefore, the present invention is applicable to all portable telecommunication instrument, either with or without a flip cover. Moreover, high specific absorption radiation levels are prevented by not allowing keypad origination signals and subsequent conversation, with the antenna not fully extended. Also, dropped calls as a result of weak signal strength, caused by operation with the antenna down, are prevented. A minimum number of steps are needed to terminate a call. If desired, the call can be terminated simply by retracting the antenna. Still further, the electrically conductive member 20, providing electrical continuity between the antenna position contacts 22, may be built into a replaceable antenna. Thus, if the antenna wears out, only the antenna needs to be replaced, not the entire instrument.

Although the present invention is described in terms of a preferred exemplary embodiment, with specific illustrative key constructions and arrangements, those skilled in the art will recognize that changes in those arrangements and constructions, such as positioning the antenna position sensing contacts on a member of the instrument other than the printed circuit board, may be made without departing from the spirit of the invention. Such changes are intended to fall within the scope of the following claims. Other aspects, features, and advantages of the present invention may be obtained from a study of this disclosure and the drawings, along with the appended claims.

What is claimed is:

1. A telecommunication instrument, comprising:
   a keypad;
   an RF circuit;
   an antenna movable between a first position and a second position;
   a first electrically conductive contact provided on said antenna at a position adjacent a proximal end of the antenna;
   a second electrically conductive contact for coupling the antenna to the RF circuit;
   an insulating layer separating the first electrically conductive contact from the second electrically conductive contact;
   a printed circuit board;
   a pair of electrical contacts on said printed circuit board at a position at which said electrical contacts are in common electrical communication with said first electrically conductive contact on said antenna when said antenna is at the first position, and completes a circuit to activate the keypad; and
   an RF contact on said printed circuit board at a position at which said RF contact is in common electrical communication with said second electrically conductive contact or said antenna when said antenna is at the second position and completes a circuit to the RF circuit.

2. A telecommunication instrument, as set forth in claim 1, further including a switch electrically positioned between said keypad and said pair of electrical contacts, said switch for enabling the keypad despite a position of the antenna.

3. A telecommunication instrument, as set forth in claim 1, further comprising:
   an antenna activation circuit compel switch that is closeable in response to activating said switch.

4. A telecommunication instrument, comprising:
   a keypad;
   an antenna movable between a retracted position and an extended position;
   an electrically conductive member provided on said antenna at a position adjacent a provisional end of the antenna;
   an electrical element adapted for coupling RF signals;
   an insulating layer disposed between said electrical element and said electrically conductive member;
   a printed circuit board; and
   a pair of electrical contacts on said printed circuit board at a position at which said electrical contacts are in other than common electrical communication with said electrically conductive member on said antenna when said antenna is at the retracted position, thereby deactivating the keypad.

5. A telecommunication instrument, as set forth in claim 4, further including a bypass switch electrically positioned between said keypad and said pair of electrical contacts for enabling the keypad despite a position of the antenna.

6. A telecommunication instrument, comprising:

a keypad;

an RF circuit;

an antenna movable between a first position and second position;

a first electrically conductive contact provided on said antenna at a position adjacent a proximal end of the antenna;

a second electrically conductive contact for coupling the antenna to the RF circuit;

an insulating layer separating and insulating the first electrically conductive contact from the second electrically conductive contact;

a printed circuit board;

a pair of electrical contacts on said printed circuit board at a position at which said electrical contacts are in common electrical communication with said first electrically conductive contact on said antenna when said antenna is at the first position and completes a circuit to activate the keypad;

an RF contact on said printed circuit board at a position at which said RF contact is in common electrical communication with said second electrically conductive contact or said antenna when said antenna is at the second position and completes a circuit to the RF circuit; and a switch electrically positioned between said keypad and said pair of electrical contacts, said switch for enabling the keypad despite a position of the antenna.

* * * * *